Patented June 12, 1951

2,556,333

UNITED STATES PATENT OFFICE 2,556,333

PROCESS FOR THE MANUFACTURE OF A NOVEL BINDING AGENT FOR CORE SAND FROM SULFITE LYE

Franz Rudolf Moser, Hausen, near Brugg, Switzerland, assignor to Oel-und Chemie-Werk A. G., Hausen, near Brugg, Switzerland No Drawing. Application February 11, 1948, Serial No. 7,715. In Switzerland May 1, 1943

Section 1, Public Law 690, August 8, 1946,
Patent expires May 1, 1963

6 Claims. (Cl. 22—188)

The binding agents used in the foundry for the manufacture of sand cores should produce cores of proper strength, it should generate a minimum of gas when the cores come in contact with the molten metal, it should give cores with a maximum of porosity and it should show good collapsibility after pouring. With the binding agents hitherto known, as for example linseed oil or other drying oils, bituminous substances, rosins and rosin oils, starch and its derivatives, glue, artificial resins or sulfite lye the above mentioned conditions can only be obtained in an unsatisfactory manner. Especially sulfitelye has the disadvantage of giving to the cores only an insufficient resistance against mechanical stresses which moreover is rapidly reduced when cores are stored and when dry sand cores are used in green sand molds.

It has now been found that a binding agent for founders sand with novel properties can be produced from sulfite lye, when the latter is mixed with substances having a carbonizing effect at the elevated temperatures usually applied in baking sand cores in an amount sufficient to more than neutralize the basic constituents of the lye and heating the mixture until a marked increase in viscosity is produced. This addition causes during the baking process, which usually is performed at temperatures of about 150°–250° C. the sulfite lye to become a hard, more or less carbonised mass, which gives to the cores the desired properties in a high degree.

As starting material one may use the lye which is obtained as a by-product in the manufacture of cellulose from wood by the sulfite process, which if desired may have been used previously in the process for the production of alcohol and which contains, besides water, inorganic substances and carbohydrates, chiefly salts of lignin sulfonic acids. A concentrated lye containing up to 50% of water or a dried powdered lye are preferably used in the present process. It is advisable to use a lye which is obtained by direct evaporation without preceding precipitation of the salts of calcium and iron.

The substances having a carbonizing effect which are suitably used in the present process are mineral acids such as sulphuric acid or phosphoric acid. Acids which are readily evaporated such as hydrochloric acid or readily reduced such as nitric acid are not so favourable.

The amount of addition of the acids depends on the composition of the sulfite lye, on the desired mechanical properties of the cores to be obtained and on the quality of the core-sand used. According to the invention the acids added to the concentrated sulfite lye containing calcium salt as preferably used, are in excess of the equivalent of basic constituents e. g. the calcium compounds present. Generally an increased addition of acid or acid forming substances will give cores with a higher compression and bending strength. When using a sand containing basic components as e. g. clay, it may be advisable to use higher additions than in the case of pure quartz sand.

In order to prevent the corrosive effect against metals, which might occur with the binding agent according to this invention, substances known as corrosion inhibitors may further be added.

As the sulfite lye contains generally derivatives of sulfurous acid yielding sulfur dioxide on addition of acid substances, it may be of advantage to remove this gas from the binding agent of the invention. This may be done in a known manner by blowing with air or other gases, heating, stirring, evacuating, surface enlargement by flowing through vessels containing filling materials or by a combination of such steps.

In order to raise the viscosity of the core binding agent to be produced, the mixture is subjected to a prolonged heating at temperatures of about 50°–100° C. preferably about 70° C. Probably the increase in viscosity is due to the known polymerisation of the lignine-sulfonic acid in the presence of acid reagents. On the other hand the viscosity may be lowered by diluting with water or watery solutions. Generally it is advisable to combine the operation of increasing viscosity with the removal of the free sulfur dioxide.

The core sand binding agent according to the invention may be used alone or together with other known binding agents.

With the new binding agent, cores may be produced which are sufficiently resistant to handling in unbaked state due to the fact that they harden even when stored in the atmosphere. The binding agent may also be used in such a way that the mixture of sand and binder obtained in the usual way is first allowed to dry under free access of air and then using this dried product as an addition to a freshly prepared mixture. This method gives cores with a good green strength and saves the use of special additions for obtaining green strength.

The binding agent according to the present invention, gives generally the best results when the cores are baked during about one hour at temperatures of about 220° C. Lower baking temperatures of about 200° C. require a longer baking of about 2 to 4 hours. When it is desired to bake the cores over night the temperature is advantageously lowered to about 180° C.

*Example*

100 parts by weight of a concentrated lime and iron containing sulfite lye with a water content of about 50% as may be obtained by direct evaporation of waste sulfite-lye liquor, containing about 4% of calcium calculated as CaO are mixed with 10 parts by weight of concentrated sulfuric acid which has been diluted with its own weight of water, while stirring. The mixture is stirred and blown with air at a temperature of 50°–100° C. preferably about 70° C. to remove free $SO_2$ and for such a time that the product has a flow out time of 25 to 30 seconds in the Ford-cup 8. After cooling 1 kg. of hexamethylene tetramine is dissolved in this product as corrosion inhibitor, while stirring.

The core sand binding agent obtained in this manner is a storable oily fluid.

The product is an excellent binding agent for pure quartz sand and gives when used in a quantity of 5 to 6% by weight cores with a high compression and bending strength, a high grade of porosity, excellent collapsibility and only a very small formation of gases.

As far as the mechanical properties of the cores obtained with the binder according to the present invention are concerned, it may be said that the bending strength is increased at least tenfold compared with untreated sulfite lye. Furthermore the cores are not hygroscopic after drying compared with those obtained with untreated sulfite lye.

I claim:

1. A process for producing a binding agent for founders core sand from sulfite lye comprising adding to the sulfite lye a mineral acid in an amount sufficient to more than neutralize the basic constituents of the lye and which brings about carbonization of the sulfite lye during subsequent baking of the core.

2. A process for producing a binding agent for founders core sand from sulfite lye comprising adding to sulfite lye liquor a polybasic mineral acid in an amount sufficient to more than neutralize the basic constituents of the lye and which brings about carbonization of the sulfite lye during subsequent baking of the core, and heating the mixture until a marked increase in viscosity is produced.

3. A process for producing a binding agent for founders core sand from sulfite lye comprising adding to sulfite lye liquor, sulfuric acid in an amount sufficient to more than neutralize the basic constituents of the lye and which brings about carbonization of the sulfite lye during subsequent baking of the core and heating the mixture until a marked increase in viscosity is produced.

4. A process for producing founders sand cores comprising adding to sulfite lye liquor, sulfuric acid in an amount sufficient to more than neutralize the basic constituents of the lye and which brings about carbonization of the sulfite lye during subsequent baking of the core, heating the mixture until a marked increase in viscosity is produced, mixing the resulting mixture with sand, forming a core and baking the core at a temperature of the order of 150° to 250° C.

5. A process for producing founders sand cores comprising adding to sulfite lye liquor, a polybasic mineral acid in an amount sufficient to more than neutralize the basic constituents of the lye and which brings about carbonization of the sulfite lye during subsequent baking of the core, mixing the resulting mixture with sand, forming a core and making the core at a temperature of the order of 150° to 250° C.

6. A process for producing founders sand cores comprising adding to sulfite waste liquor, a mineral acid in an amount sufficient to more than neutralize the basic constituents of the lye and which brings about carbonization of the sulfite lye during subsequent baking of the core, heating the mixture until a marked increase in viscosity is produced, mixing the resulting mixture with sand, forming a core and baking the core at a temperature of the order of 150° to 250° C.

FRANZ RUDOLF MOSER.

REFERENCES CITED

The following references are of record in the file of this patent:

UNITED STATES PATENTS

| Number | Name | Date |
| --- | --- | --- |
| 833,634 | Robeson | Oct. 16, 1906 |
| 1,467,321 | Hurt | Sept. 11, 1923 |
| 1,507,678 | Nagel | Sept. 9, 1924 |
| 1,719,168 | Chamberlin | July 2, 1929 |
| 1,977,728 | Leach | Oct. 23, 1934 |
| 2,116,227 | Winlof | May 3, 1938 |
| 2,401,760 | Heyroth | June 11, 1946 |
| 2,457,357 | Fenn | Dec. 28, 1948 |

FOREIGN PATENTS

| Number | Country | Date |
| --- | --- | --- |
| 275,214 | Germany | June 11, 1914 |
| 573,171 | Great Britain | Nov. 8, 1945 |
| 166,109 | Spain | Not available |
| 407,556 | Italy | Nov. 2, 1944 |
| 22,018 | Finland | Apr. 30, 1947 |
| 440,792 | Canada | Apr. 15, 1947 |
| 904,103 | France | Feb. 19, 1945 |